UNITED STATES PATENT OFFICE.

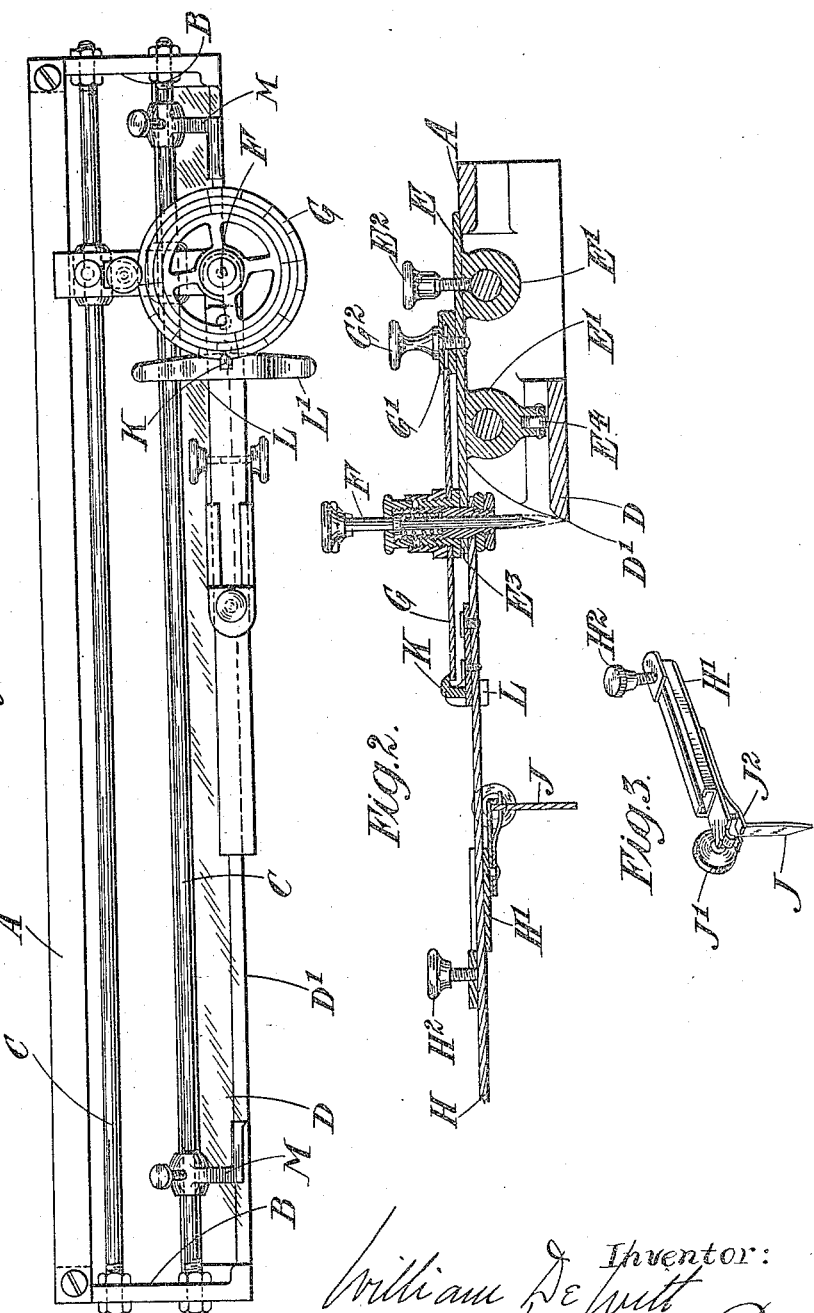

WILLIAM DE WITT, OF KOBE, JAPAN, ASSIGNOR TO CAPTAIN DEWITT'S NAVIRULE GOMEI KAISHA, OF KOBE, JAPAN.

NAVIGATION-RULE.

1,282,770.  Specification of Letters Patent.  Patented Oct. 29, 1918.

Application filed September 6, 1917. Serial No. 190,017.

*To all whom it may concern:*

Be it known that I, WILLIAM DE WITT, a citizen of the United States of America, residing in Kobe, Japan, have invented a certain new and Improved Navigation-Rule, of which the following is a specification.

This invention relates to navigation rules, namely instruments that are to be employed for application to charts to facilitate the determination of courses and directions thereon and also of distances. The present invention is intended for use in substitution for the "latitude rule," commonly used by navigators and serves to survey the course and bearings with both simplicity and accuracy, without, however, requiring an investigation of or computation from the compass commonly printed upon charts.

One construction of apparatus according to this invention is shown in the accompanying drawings in which—

Figure 1 is a plan of the instrument;

Fig. 2 a section thereof on the line 2—2 of Fig. 1, but to a larger scale than that of Fig. 1 and with the arm extended from the folded position shown in Fig. 1 to extend at right angles to the body of the instrument;

Fig. 3 is a perspective view of a detail, and

Figure 4:
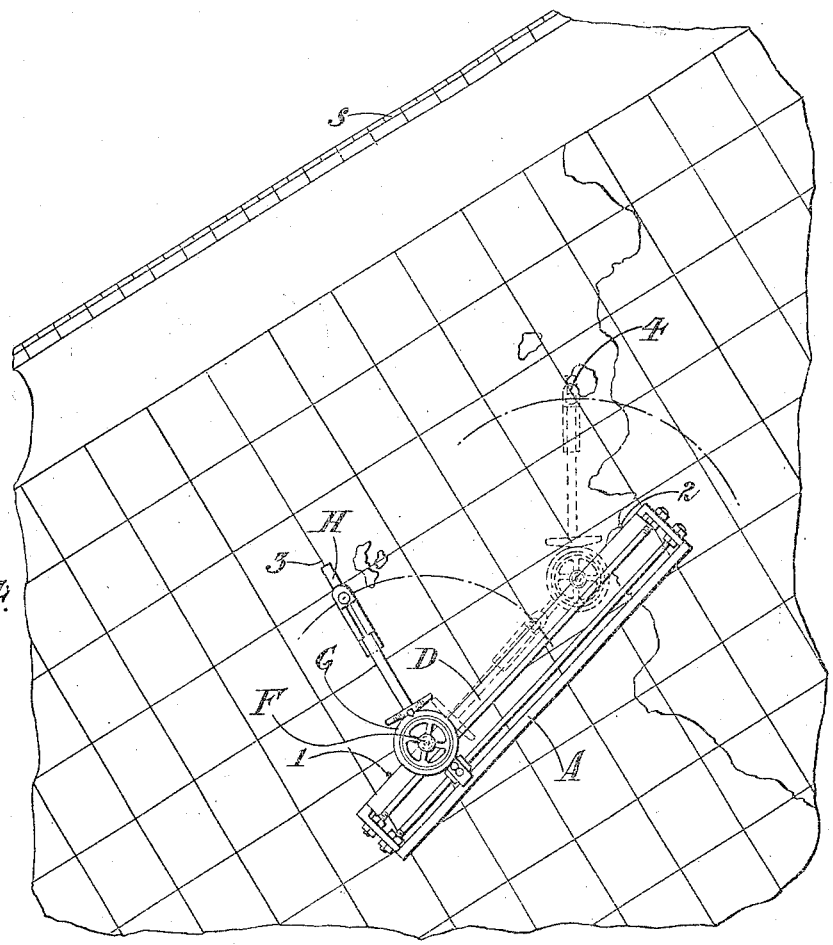
Fig. 4 is a diagram illustrating the use of the instrument.

The instrument comprises an open framework formed with a stiff bar A from which two end plates B project at right angles to the bar, and between which two end plates, two rods C extend parallel to one another. To the under face of the free ends of the plates B is secured a straight edge D, which is preferably of transparent material, such as celluloid, and whose straight edge $D^1$ is parallel with the rods C. A rider E is provided to slide upon the rods C which it embraces by means of sockets $E^1$. A clamping screw $E^2$ is provided on the rearmost socket so as to clamp the rider in any desired position and beneath the other socket is a roller $E^4$ arranged to run upon the upper face of the straight edge D.

At the forwardly projecting end of the rider is a boss $E^3$ in the center of which is a vertical hole whose center is immediately over the edge $D^1$ of the straight edge. The boss $E^3$ serves to determine the position and movement of three parts, namely a pricker F, a protractor or compass-card G, and a rotatable arm H. The pricker is spring-pressed in the position shown in full lines in Fig. 2 in which it is raised from the straight edge but may be depressed against the spring to bring its point to and just below the edge of the straight edge.

The compass-card G is mounted upon the boss so as to rotate accurately about a vertical axis through the point of the pricker F and a clamp $G^1$ operated by a screw $G^2$ is provided on the rider to clamp the card.

The rotatable arm H is also mounted upon the boss $E^3$ so as to rotate concentrically with the compass-card about the axis of the pricker F, and carries a slider $H^1$ which may be slid upon it and clamped in any position by means of a screw $H^2$. The slider is provided with a second pricker J which may be moved by means of knurled disks $J^1$ against the action of a snap-spring $J^2$ either into the downwardly depending position in which it is shown in the drawings or into a position in which it is housed snugly against the under side of the slider $H^1$.

Near the inner end of the arm H is an indicating point K arranged to coöperate with the indications upon the compass-card G and provide a reading point therefor. There is also a bar L astride the arm H at right angles thereto and recessed on its under face with two recesses each adapted in one position to snap upon the forward bar C and so hold the arm H parallel to the edge $D^1$. Since the pricker J is central on the bar H it just touches the edge $D^1$ when the bar L is snapped by either of its ends into engagement with the rod C.

The instrument is susceptible of a variety of uses and one use thereof is now described with reference to Fig. 4. In this diagram, which represents a portion of a chart, the ship's position is supposed to have been determined as being at the point market 1 and it is desired to lay a course to the destination marked 2. The instrument is applied to the chart with the edge $D^1$ extending between the points 1 and 2 and the rider E is then moved along the rods C until the pricker F is vertically over either a meridian line or a latitude line upon the chart, such as the line marked 3. The rider is clamped here by the screw $E^2$. The arm H is then swung around boss $E^3$ until the second pricker J lies upon the same selected meridian or latitude 3. The compass-card G is then rotated to bring it to indicate true north which can now readily be done by bringing it to the position in which the indicator K on the arm H is in register with either the lubber point on the card, or the south mark if the line 3 be a meridian, or with the east or west point on the card if the line 3 be a latitude. The card is then firmly clamped by means of the screw G², the screw E² is loosened and the rider moved to bring the pricker F to the point 1. The arm H is then swung around until the bar L snaps on to the rod C, in which position of the parts the indicator K will give the course to be set from the station 1 to the destination 2. Further, if the pricker J be now shifted (if necessary) to rest upon the point 2 and there clamped the instrument may be transferred to the scale usually provided on a chart, and as indicated at *s* in Fig. 4, when the distance between the points 1 and 2 can immediately be read.

Further, if the instrument be again applied with the straight edge along the line 1—2 the rider may be slid to bring the pricker F to any desired position, such, for example, as that indicated at 4, to give the bearing from that point of a land mark such as that suggested at 5 in Fig. 4. During these operations and until a fresh set of surveys (other than those with reference to the points 1—2 and the course between them) is undertaken, the compass-card, having been once clamped as described, must be kept clamped. The arm H, however, may be swung in any desired manner and the pricker upon it shifted as necessary to give various details of information of distances or bearings, such as a navigator will readily obtain by it.

The construction described is convenient for moving about and for packing, since the pricker J can be folded against the under side of the arm H, and the latter can be swung to lie parallel with the rod C in which position of the parts the instrument is very compact.

Two sliding pointers M are mounted to slide along one of the bars C and be clamped at will in any desired position for convenience in recording the points with reference to which a measurement is being or has been taken.

What I claim as my invention and desire to secure by Letters Patent is:—

1. In a navigating rule the combination of a base having a flat surface in its bottom, a rule having a straight edge, an arm supported upon the base to rotate about an axis that is in a plane at right angles to the said flat surface on the bottom of the base and that contains the said straight edge and which arm is also guided to move to keep its rotational axis always in the said plane, an indicator operatively connected with the said arm so as to move therewith to indicate that point in the plane of the said flat surface which is also in the rotational axis of the arm, a gage-point adjustable on the arm toward and away from its rotational center, and means to measure the angle between the said straight edge and the line containing the said gage-point and the rotational axis of the arm.

2. In a navigating rule the combination of a base having a flat surface in its bottom, a rule having a straight edge, an arm supported upon the base to rotate about an axis that is in a plane at right angles to the said flat surface on the bottom of the base and that contains the said straight edge and which arm is also guided to move to keep its rotational axis always in the said plane, a resiliently mounted pricker normally held in the inoperative position but displaceable to bring its point to the point of intersection of the plane containing the said flat surface in the bottom of the base and the rotational axis of the arm, a gage-point adjustable on the arm toward and away from its rotational center, and means to measure the angle between the said straight edge and the line containing the said gage-point and the rotational axis of the arm.

3. In a navigating rule the combination of a base having a flat surface in its bottom, a rule having a straight edge, an arm supported upon the base to rotate about an axis that is in a plane at right angles to the said flat surface of the bottom of the base and that contains the said straight edge and which arm is also guided to move to keep its rotational axis always in the said plane, means to identify that point on the straight edge which is in the rotational axis of the arm, a gage-point adjustable on the arm toward and away from its rotational center, a compass-card mounted to rotate about the rotational axis of the arm, and an angle indicator upon the arm coöperating with the scale upon the compass-card.

4. In a navigating rule the combination of a base having a flat surface in its bottom, a rule having a straight edge, an arm supported upon the base to rotate about an axis that is in a plane at right angles to the said flat surface on the bottom of the base and that contains the said straight edge and which arm is also guided to move to keep its rotational axis always in the said plane, means to identify that point on the straight edge which is in the rotational axis of the arm, a gage-point adjustable on the arm toward and away from its rotational center, a compass-card mounted to rotate about the rotational axis of the arm, an angle-indicator upon the arm coöperating with the scale upon the compass-card and provided with means to clamp the card against rotation.

5. In a navigating rule the combination of a base having a flat surface in the bottom, a rule having a straight edge, a guide to provide a path parallel to the straight edge of the rule, a carriage supported upon the said guide, an arm so rotatably mounted upon the said carriage that the rotational axis of the arm is in a plane at right angles to the said flat surface in the bottom of the base and containing the said straight edge, means to indicate that point in the plane of the said flat surface which is in the rotational axis of the arm, a gage-point adjustable on the arm toward and away from its rotational center, and means to measure the angle between the said straight edge and the line containing the said gage-point and the rotational axis of the arm.

6. In a navigating rule the combination of a base having a flat surface in its bottom, a rule having a straight edge, a straight arm supported upon the base to rotate about an axis that is in a plane at right angles to the said flat surface on the bottom of the base and that contains the said straight edge and which arm is also guided to move to keep the rotational axis always in the said plane, which straight arm is provided with a snap-catch to snap-lock the arm in either of two positions in which it is parallel to the said straight edge, means to identify that point on the straight edge which is in the rotational axis of the arm, a gage-point adjustable on the arm toward and away from its rotational center, and means to measure the angle between the said straight edge and the line containing the said gage-point and the rotational axis of the arm.

7. In a navigating rule the combination of a base having a flat surface in its bottom, a rule having a straight edge, a straight arm supported upon the base to rotate about an axis that is in a plane at right angles to the said flat surface on the bottom of the base and that contains the said straight edge and which arm is also guided to move to keep its rotational axis always in the said plane and provided with a cross-bar whose under surface is notched to engage the guide for the arm and snap-lock the arm in either of two positions in which it is parallel to the said straight edge, means to identify that point on the straight edge which is in the rotational axis of the arm, a gage-point adjustable on the arm toward and away from its rotational center, and means to measure the angle between the said straight edge and the line containing the said gage-point and the rotational axis of the arm.

8. In a navigating rule the combination of a base in the form of a bar having a flat under surface and carrying two members projecting from the same edge of it parallel to one another, one at each end of the bar, a straight edge secured to the said two projecting members, a rule having a straight edge, an arm supported upon the base to rotate about an axis that is in a plane at right angles to the said flat surface on the bottom of the base and that contains the said straight edge and which arm is also guided to move to keep its rotational axis always in the said plane, means to indicate that point in the plane of the said flat surface which is in the rotational axis of the arm, a gage-point adjustable on the arm toward and away from its rotational center, and means to measure the angle between the said straight edge and the line containing the said gage-point and the rotational axis of the arm.

9. In a navigating rule the combination of a base constructed as an open rectangular frame having a flat under surface and such that one side of the frame is constituted by a transparent straight edged rule, two guide rods extending parallel to the said straight edge from end to end of the frame, a rider slidable along the said rods, an arm upon the rider mounted to rotate about an axis at right-angles to the under surface of the base and intersecting the said straight edge, means to indicate that point in the plane of the said flat surface which is in the rotational axis of the arm, a gage-point adjustable on the arm toward and away from its rotational center, and means to measure the angle between the said straight edge and the line containing the said gage-point and the rotational axis of the arm.

In testimony whereof I have signed my name to this specification in the presence of two subscribing witnesses.

WILLIAM DE WITT.

Witnesses:
HARRY C. LEWIS,
JENNIE E. LEAF.

Copies of this patent may be obtained for five cents each, by addressing the "Commissioner of Patents, Washington, D. C."